United States Patent
Yao et al.

(10) Patent No.: US 11,895,543 B2
(45) Date of Patent: Feb. 6, 2024

(54) MRO FOR 5G NETWORKS

(71) Applicant: Intel Corporation, Santa Clara, CA (US)

(72) Inventors: Yizhi Yao, Chandler, AZ (US); Joey Chou, Scottsdale, AZ (US)

(73) Assignee: Intel Corporation, Santa Clara, CA (US)

(*) Notice: Subject to any disclaimer, the term of this patent is extended or adjusted under 35 U.S.C. 154(b) by 162 days.

(21) Appl. No.: 17/219,292

(22) Filed: Mar. 31, 2021

(65) Prior Publication Data
US 2021/0377827 A1     Dec. 2, 2021

Related U.S. Application Data

(60) Provisional application No. 63/005,957, filed on Apr. 6, 2020.

(51) Int. Cl.
*H04W 36/00*     (2009.01)

(52) U.S. Cl.
CPC .............. *H04W 36/0083* (2013.01)

(58) Field of Classification Search
None
See application file for complete search history.

(56) References Cited

U.S. PATENT DOCUMENTS

| | | | | |
|---|---|---|---|---|
| 2013/0163450 A1* | 6/2013 | Kreuchauf | ...... | H04W 36/00837 370/252 |
| 2013/0303155 A1* | 11/2013 | Da Silva | ...... | H04W 36/0085 455/423 |
| 2014/0200001 A1* | 7/2014 | Song | ...... | H04W 36/0094 455/436 |
| 2015/0016289 A1* | 1/2015 | Yun | ...... | H04W 24/02 370/252 |
| 2015/0271025 A1* | 9/2015 | Yao | ...... | H04L 67/12 370/241.1 |

(Continued)

OTHER PUBLICATIONS

3GPP TS 28.313 v0.3.0, Technical Specification Group Services and System Aspects; Management and Orchestration; Self-Organizing Networks (SON) for 5G Networks (Release 16), Mar. 2020, pp. 1-43. (Year: 2020).*

(Continued)

*Primary Examiner* — Nicholas Sloms
(74) *Attorney, Agent, or Firm* — Schwegman Lundberg & Woessner, P.A.

(57) ABSTRACT

A method and system to provide Mobility Robustness Optimization (MRO) in a NR network are described. The MRO parameters, use case, management services and information definition and procedures are described. A distributed self-organized network (D-SON) management function requests a producer of provisioning management service (MnS) to set targets, handover parameter ranges, and control information for an MRO function and then enables the MRO function for a non-enabled NR cell. The MRO function receives and analyses information from UEs to determine actions to optimize MRO performance. The D-SON management function collects and analyses MRO related performance measurements to evaluate the MRO performance, and updates the targets, handover parameter ranges, and/or control information when the MRO performance does not meet the targets.

16 Claims, 6 Drawing Sheets

(56) References Cited

U.S. PATENT DOCUMENTS

| | | | | |
|---|---|---|---|---|
| 2016/0044569 A1* | 2/2016 | Lunden | ............. | H04W 36/0058 |
| | | | | 370/331 |
| 2016/0127923 A1* | 5/2016 | Matsunaga | ......... | H04W 36/385 |
| | | | | 455/418 |
| 2016/0174080 A1* | 6/2016 | Siradjev | ................ | H04L 47/125 |
| | | | | 455/422.1 |
| 2017/0055185 A1* | 2/2017 | Chaudhuri | ........ | H04W 36/0085 |
| 2017/0208526 A1* | 7/2017 | Madan | ............ | H04W 36/00837 |
| 2017/0332302 A1* | 11/2017 | Ercan | ................ | H04W 36/0088 |
| 2018/0123885 A1* | 5/2018 | Stenberg | ............. | H04L 41/0853 |
| 2018/0176837 A1* | 6/2018 | Xiao | ..................... | H04L 5/0051 |
| 2018/0352467 A1* | 12/2018 | Delsol | ............... | H04W 36/0094 |
| 2019/0045568 A1* | 2/2019 | Palat | .................... | H04W 76/27 |
| 2019/0075552 A1* | 3/2019 | Yu | ......................... | H04W 24/10 |
| 2019/0102322 A1* | 4/2019 | Chhabra | ............. | G06F 12/1466 |
| 2019/0394655 A1* | 12/2019 | Rahman | .............. | H04L 41/5058 |
| 2022/0141738 A1* | 5/2022 | Chou | .................. | H04L 41/5051 |
| | | | | 455/437 |
| 2022/0159536 A1* | 5/2022 | Sama | ....................... | H04W 8/06 |
| 2022/0167235 A1* | 5/2022 | Geng | ................ | H04W 36/0083 |

OTHER PUBLICATIONS

3GPP TS 28.861 v2.0.0, Technical Specification Group Services and System Aspects; Telecommunication Management; Study on the Self-Organizing Networks (SON) for 5G Networks (Release 16), Dec. 2019, pp. 1-49. (Year: 2019).*

* cited by examiner

MRO FOR 5G NETWORKS

PRIORITY CLAIM

This application claims the benefit of priority to U.S. Provisional Patent Application Ser. No. 63/005,957, filed, Apr. 6, 2020, which is incorporated herein by reference in its entirety.

TECHNICAL FIELD

Embodiments pertain to wireless communications in 5G, or new radio (NR), systems. Some embodiments related to Mobility Robustness Optimization (MRO) in 5G networks.

BACKGROUND

The use and complexity of 3GPP LTE systems (including LTE and LTE-Advanced systems) has increased due to both an increase in the types of devices user equipment (UEs) using network resources as well as the amount of data and bandwidth being used by various applications, such as video streaming, operating on these UEs. With the vast increase in number and diversity of communication devices, the corresponding network environment, including routers, switches, bridges, gateways, firewalls, and load balancers, has become increasingly complicated, especially with the advent of next generation (NG) (or new radio (NR)/$5^{th}$ generation (5G)) systems. As expected, a number of issues abound with the advent of any new technology.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
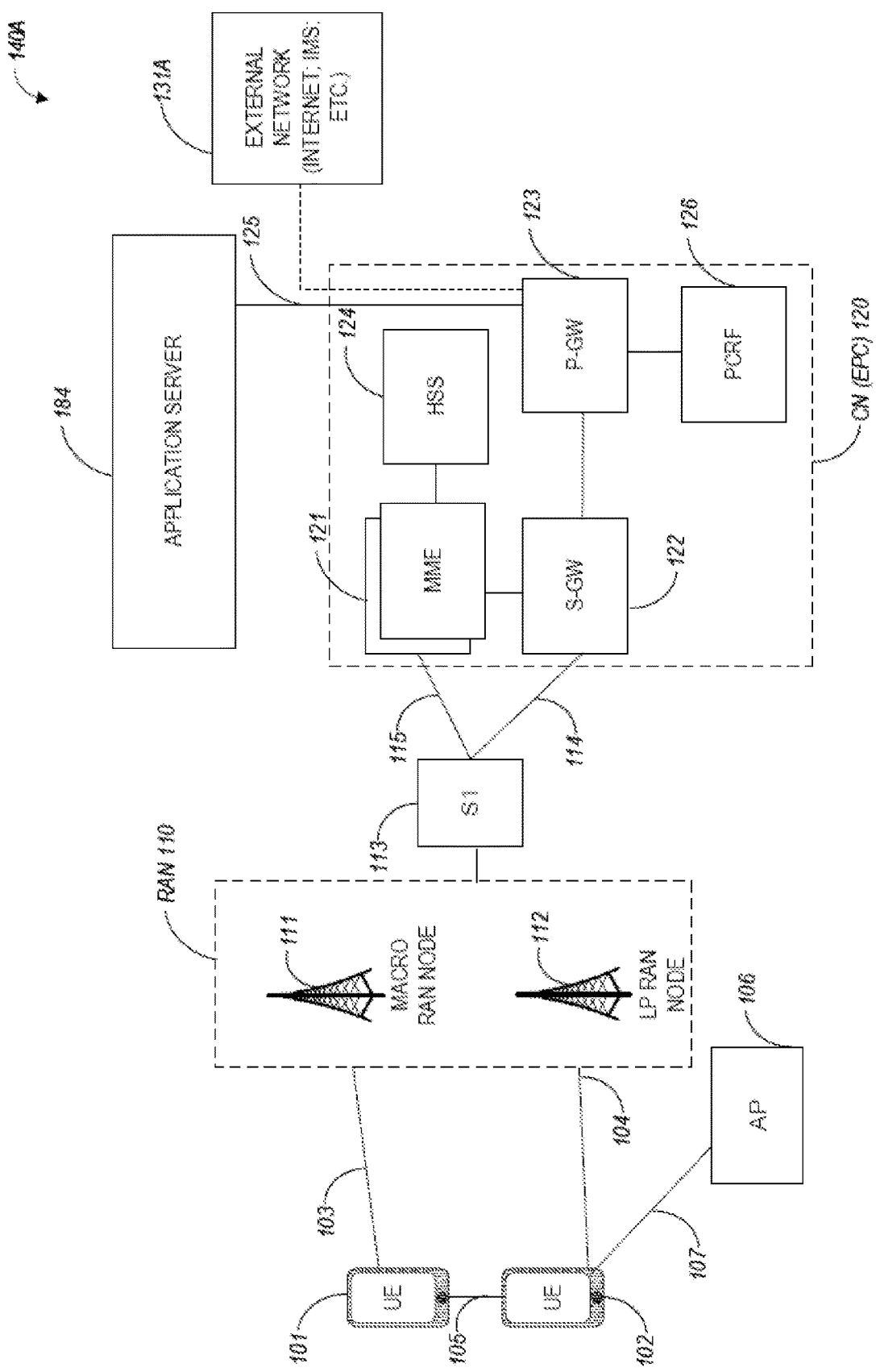
FIG. 1A illustrates an architecture of a network, in accordance with some aspects.

FIG. 1A illustrates an architecture of a network in accordance with some aspects. The network 140A includes 3GPP LTE/4G and NG network functions. A network function can be implemented as a discrete network element on a dedicated hardware, as a software instance running on dedicated hardware, and/or as a virtualized function instantiated on an appropriate platform, e.g., dedicated hardware or a cloud infrastructure.

The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as portable (laptop) or desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard. Any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and other frequencies and Spectrum Access System (SAS) in 3.55-3.7 GHz and other frequencies). Different Single Carrier or Orthogonal Frequency Domain Multiplexing (OFDM) modes (CP-OFDM, SC-FDMA, SC-OFDM, filter bank-based multicarrier (FBMC), OFDMA, etc.), and in particular 3GPP NR, may be used by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN.

The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), a Physical Sidelink Broadcast Channel (PSBCH), and a Physical Sidelink Feedback Channel (PSFCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a gNB, an eNB, or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G network, including 5G new radio network using communications in the licensed (5G NR) and the unlicensed (5G NR-U) spectrum. One of the current enablers of IoT is the narrowband-IoT (NB-IoT). Operation in the unlicensed spectrum may include dual connectivity (DC) operation and the standalone LTE system in the unlicensed spectrum, according to which LTE-based technology solely operates in unlicensed spectrum without the use of an "anchor" in the licensed spectrum, called Multe-Fire. Further enhanced operation of LTE systems in the licensed as well as unlicensed spectrum is expected in future releases and 5G systems. Such enhanced operations can include techniques for sidelink resource allocation and UE processing behaviors for NR sidelink V2X communications.

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes as provided by 3GPP Technical Specification (TS) 23.501 (e.g., V15.4.0, 2018-12). In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
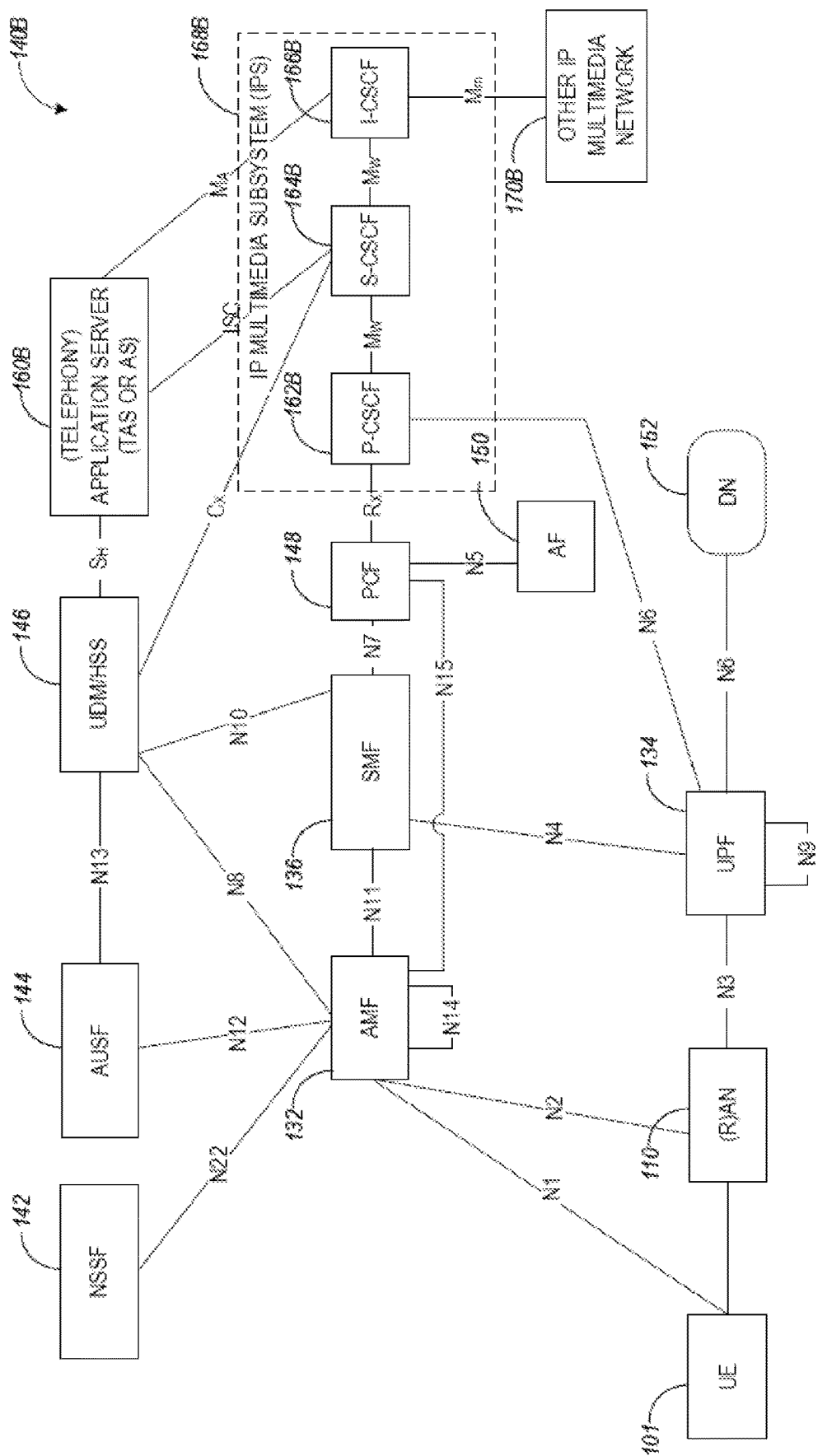
FIG. 1B illustrates a non-roaming 5G system architecture in accordance with some aspects.

FIG. 1B illustrates a non-roaming 5G system architecture in accordance with some aspects. In particular, FIG. 1B illustrates a 5G system architecture 140B in a reference point representation. More specifically, UE 102 can be in communication with RAN 110 as well as one or more other 5GC network entities. The 5G system architecture 140B includes a plurality of network functions (NFs), such as an AMF 132, session management function (SMF) 136, policy control function (PCF) 148, application function (AF) 150, UPF 134, network slice selection function (NSSF) 142, authentication server function (AUSF) 144, and unified data management (UDM)/home subscriber server (HSS) 146.

The UPF 134 can provide a connection to a data network (DN) 152, which can include, for example, operator services, Internet access, or third-party services. The AMF 132 can be used to manage access control and mobility and can also include network slice selection functionality. The AMF 132 may provide UE-based authentication, authorization, mobility management, etc., and may be independent of the access technologies. The SMF 136 can be configured to set up and manage various sessions according to network policy. The SMF 136 may thus be responsible for session management and allocation of IP addresses to UEs. The SMF 136 may also select and control the UPF 134 for data transfer. The SMF 136 may be associated with a single session of a UE 101 or multiple sessions of the UE 101. This is to say that the UE 101 may have multiple 5G sessions. Different SMFs may be allocated to each session. The use of different SMFs may permit each session to be individually managed. As a consequence, the functionalities of each session may be independent of each other.

The UPF 134 can be deployed in one or more configurations according to the desired service type and may be connected with a data network. The PCF 148 can be configured to provide a policy framework using network slicing, mobility management, and roaming (similar to PCRF in a 4G communication system). The UDM can be configured to store subscriber profiles and data (similar to an HSS in a 4G communication system).

The AF 150 may provide information on the packet flow to the PCF 148 responsible for policy control to support a desired QoS. The PCF 148 may set mobility and session management policies for the UE 101. To this end, the PCF 148 may use the packet flow information to determine the appropriate policies for proper operation of the AMF 132 and SMF 136. The AUSF 144 may store data for UE authentication.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1E can also be used.

Figure 1C:
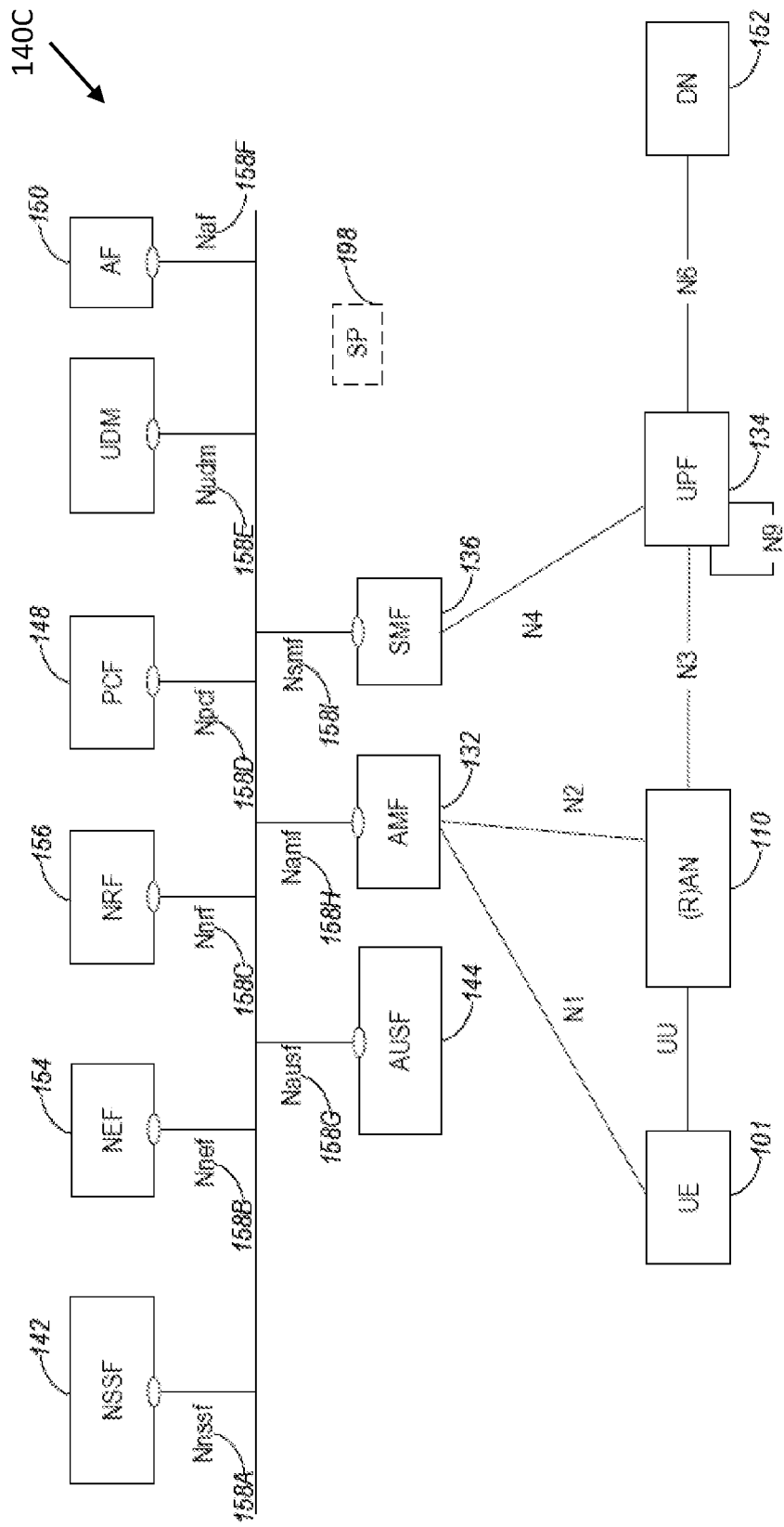
FIG. 1C illustrates a non-roaming 5G system architecture in accordance with some aspects.

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

NR-V2X architectures may support high-reliability low latency sidelink communications with a variety of traffic patterns, including periodic and aperiodic communications with random packet arrival time and size. Techniques disclosed herein can be used for supporting high reliability in distributed communication systems with dynamic topologies, including sidelink NR V2X communication systems.

Figure 2:
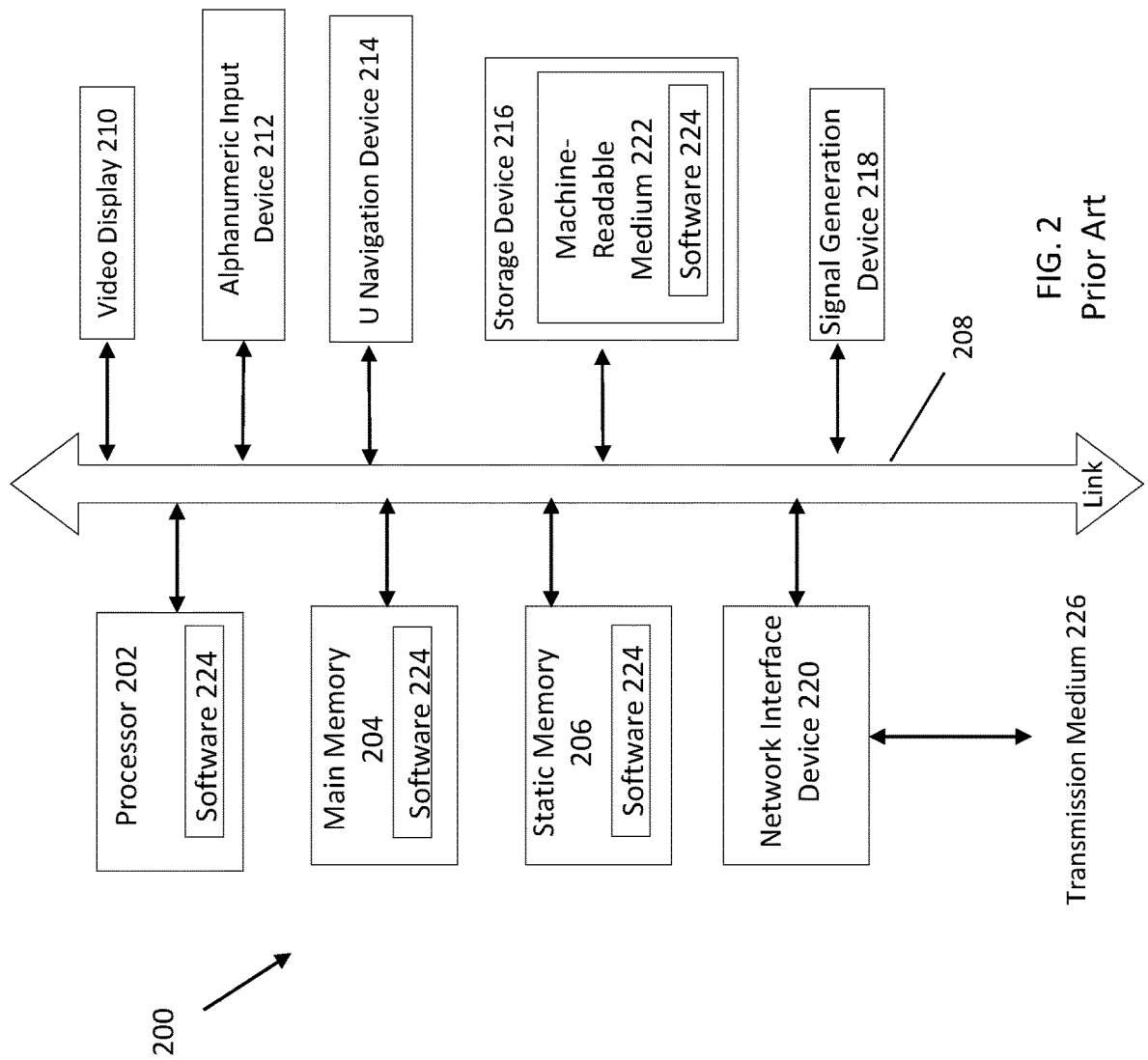
FIG. 2 illustrates a block diagram of a communication device in accordance with some embodiments.

FIG. 2 illustrates a block diagram of a communication device in accordance with some embodiments. The communication device 200 may be a UE such as a specialized computer, a personal or laptop computer (PC), a tablet PC, or a smart phone, dedicated network equipment such as an eNB, a server running software to configure the server to operate as a network device, a virtual device, or any machine capable of executing instructions (sequential or otherwise) that specify actions to be taken by that machine. For example, the communication device 200 may be implemented as one or more of the devices shown in FIG. 1. Note that communications described herein may be encoded before transmission by the transmitting entity (e.g., UE, gNB) for reception by the receiving entity (e.g., gNB, UE) and decoded after reception by the receiving entity.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor (or equivalently processing circuitry) 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Radio access Memory (RAM); and CD-ROM and DVD-ROM disks.

The instructions 224 may further be transmitted or received over a communications network using a transmission medium 226 via the network interface device 220 utilizing any one of a number of wireless local area network (WLAN) transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/5$^{th}$ generation (5G) standards among others. In an example, the network interface device 220 may include one or more physical jacks (e.g., Ethernet, coaxial, or phone jacks) or one or more antennas to connect to the transmission medium 226.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

As above, a number of enhancements have been involved in establishing 5G systems. Self-organizing networks (SONs) are one such enhancement, which operate based on SON algorithms Different types of SONs may be used. In a centralized SON (C-SON), the SON algorithm executes in a 3GPP management system. A C-SON solution may be a Cross Domain-Centralized SON solution, in which the SON algorithms are executed in the 3GPP Cross Domain layer, a Domain-Centralized SON solution, in which the SON algorithms are executed in the 3GPP Domain layer, or a hybrid SON. In a Distributed SON (D-SON) solution, the SON algorithms are executed in the Network Function layer of the 5G system.

The SON algorithm may include: monitoring the network(s) by collecting management data, including the data provided by the management data analytics service (MDAS); analyzing the management data to determine if there are issues in the network(s) to be resolved; making the decision on the SON actions to resolve the issues; executing the SON actions; and evaluating whether the issues have been solved by analyzing the management data. Accordingly, in a Cross Domain-Centralized SON, the management function(s) (MnF) in the 3GPP Cross Domain layer monitors the networks via the management data, analyzes the management data, makes decisions on the SON actions, and executes the SON actions.

In the domain-centralized SON, the MnF(s) in the domain layer monitors the networks via management data, analyzes the management data, makes decisions on the SON actions, and executes the SON actions. The MnF(s) in the Cross Domain layer is responsible for management and control of the Domain-Centralized SON function. The management and control may include switching on/off of a Domain-Centralized SON function, making policies for a Domain-Centralized SON function, and/or evaluating the performance of a Domain-Centralized SON function.

In the D-SON, the SON algorithm is located in the NFs. Accordingly, the NFs monitors the network events, analyzes the management data, makes decisions on the SON actions, and executes the SON actions. The D-SON management function switches on/off a D-SON function and provides policies, targets, and supplementary information (e.g., the range attributes) for a D-SON function. The D-SON evaluation function evaluates whether the issues have been resolved and may apply D-SON management actions.

In the hybrid SON, the SON algorithm is executed at two or more of the NF layer, the Domain layer or the 3GPP Cross Domain layer. The 3GPP management system (i.e., MnF(s) in the Domain or 3GPP Cross Domain) and the NFs work together, in a coordinated manner, to build up a complete SON algorithm. The decisions on SON actions may be made by 3GPP management system and/or NFs.

The SON architecture may be used to provide MRO. One objective of MRO is to dynamically improve the handover performance of a UE in order to improve end-user experience, as well as increase network capacity. MRO thus permits automatically configuring the handover parameters to adjust handover boundaries based on the analysis of handover-related performance measurements and radio link failure (RLF) events. Typically, this may eliminate RLF and reduce undesired handovers.

Figure 3:
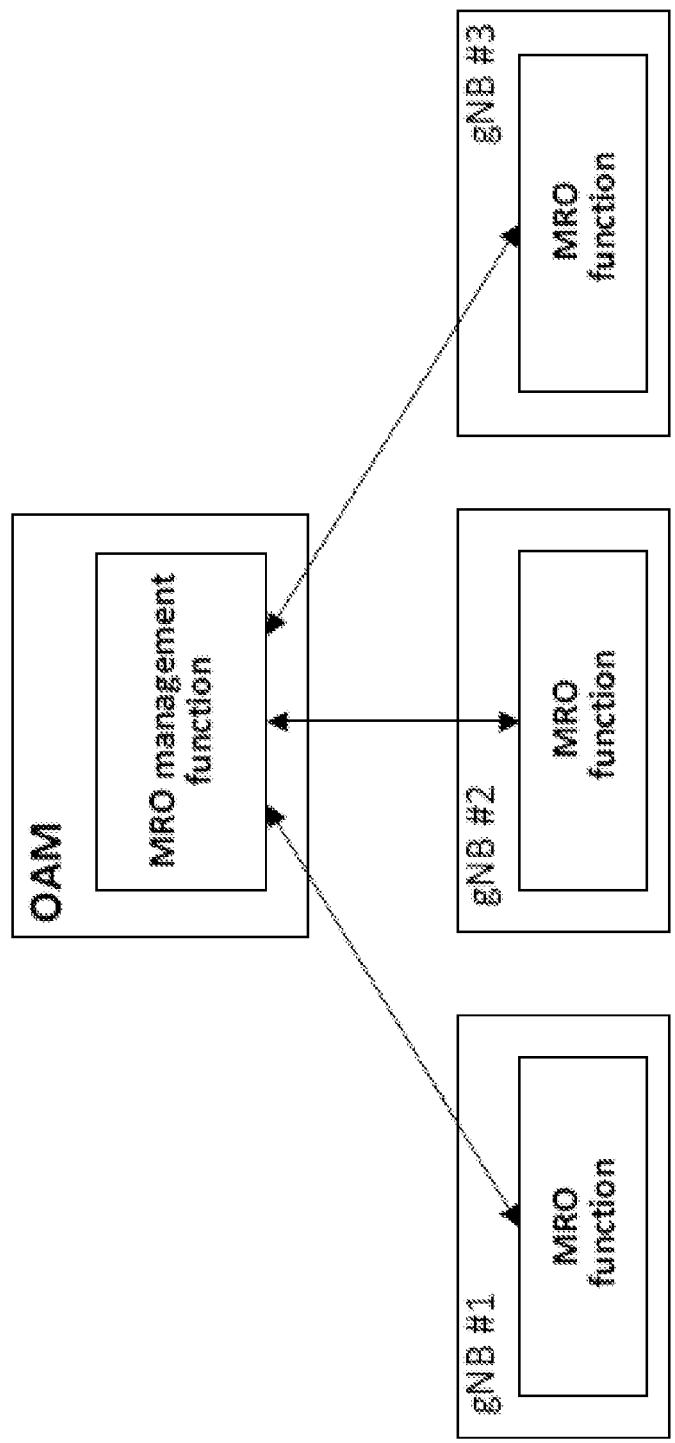
FIG. 3 illustrates an MRO architecture in accordance with some embodiments.

FIG. 3 illustrates an MRO architecture in accordance with some embodiments. In FIG. 3, the MRO system manages and controls the MRO functions residing in a gNB. This example may provide a distributed self-organizing network (SON) function.

The embodiments disclosed herein are directed to MROs for 5G networks targeting TS 28.313, v. 0.3.0, 2020 Mar. 27, which is herein incorporated by reference in its entirety. Accordingly, MRO requirements, MRO use cases, management services and information definition to support MRO, and MRO procedures are described herein.

6.1.1 Distributed SON Management
6.1.1.2 MRO (Mobility Robustness Optimization)
REQ-MRO-FUN-1 The producer of provisioning MnS should have a capability allowing the MnS consumer to set the targets, HO parameter ranges, and control parameters for MRO function.

REQ-MRO-FUN-2 The producer of provisioning MnS should have a capability allowing the MnS consumer to collect the handover related performance measurements that are used to evaluate the MRO performance.

REQ-MRO-FUN-3 The producer of provisioning MnS should have a capability allowing the MnS consumer to enable or disable the MRO function.

REQ-MRO-FUN-4 The producer of provisioning MnS should have a capability allowing the MnS consumer to update the targets, ranges, and control information for MRO function.

6.4 Use Cases
6.4.1 Distributed SON Management
6.4.2 6.4.1.2 MRO (Mobility Robustness Optimization)

| Use case stage | Evolution/Specification | <<Uses>> Related use |
|---|---|---|
| Goal | To automatically configure the handover parameters in cells in order to improve the handover performance. | |
| Actors and Roles | D-SON management function to support MRO function. | |
| Telecom resources | gNB; The producer of provisioning MnS | |
| Assumptions | N/A | |
| Pre-conditions | 5G NR cells are in operation. MRO is in operation. | |
| Begins when | The D-SON management decides to enable MRO function. | |
| Step 1 (M) | The D-SON management function requests the producer of provisioning MnS to set the targets, HO parameter ranges, and control information (e.g. Maximum deviation of Handover Trigger, Minimum time between Handover Trigger changes) for the MRO function. | |
| Step 2 (M) | The D-SON management function requests the producer of provisioning MnS to enables the MRO function. | |
| Step 3 (M) | The MRO function detects handover issues (e.g. too late HO, too early HO and HO to a wrong cell) in intra-RAT or inter-RAT mobility by analyzing reports from UEs and network side information, and acts to mitigate the HO issues by adjusting HO related parameters. | |
| Step 4 (M) | The D-SON management function collects MRO related measurements, and analyzes them to evaluate the MRO performance. | |
| Step 5 (M) | The D-SON management function performs the following action, if the MRO performance does not meet the target: 1. Update the targets for MRO function. 2. Update the ranges for MRO function. 3. Update the control information for MRO function. | |
| Ends when | All the steps identified above are successfully completed. | |
| Exceptions | One of the steps identified above fails. | |
| Post-conditions | The MRO performance has been optimized. | |
| Traceability | REQ-MRO-FUN-1, REQ- MR-FUN-2, REQ-MRO-FUN-3, REQ-MRO-FUN-4 | |

7.1.2 MRO (Mobility Robustness Optimization)
7.1.2.1 MnS Component Type a

| MnS Component Type A | Note |
|---|---|
| Operations defined in clause 5 of TS 28.532: getMOIAttributes operation modifyMOIAttributes operation notifyMOIAttributeValueChange operation | It is supported by Provisioning MnS for NF, as defined in 28.531. |
| Operations defined in clause 11.3.1.1.1 in TS 28.532 and clause 6.2.3 of TS 28.550: notifyFileReady operation reportStreamData operation | It is supported by Performance Assurance MnS for NFs, as defined in 28.550. |

7.1.2.2 MnS Component Type B Definition
7.1.2.2.1 Targets Information
The targets of MRO are shown in the Table 7.1.2.2.1-1.

TABLE 7.1.2.2.1-1

MRO targets

| Target Name | Definition | Legal Values |
|---|---|---|
| Total handover failure rate | (the number of failure events related to handover)/(the total number of handover events) | [0 . . . 100] in unit percentage |
| Total intra-RAT handover failure rate | (the number of failure events related to intra-RAT handover)/(the total number of handover events) | [0 . . . 100] in unit percentage |
| Intra-RAT too early handover failure rate | (the number of too early handover failure events related to intra-RAT handover)/(the total number of handover events) | [0 . . . 100] in unit percentage |

TABLE 7.1.2.2.1-1-continued

MRO targets

| Target Name | Definition | Legal Values |
| --- | --- | --- |
| Intra-RAT too late handover failure rate | (the number of too late handover failure events related to intra-RAT handover)/(the total number of handover events) | [0 ... 100] in unit percentage |
| Intra-RAT handover to wrong cell failure rate | (the number of handover to wrong cell failure events related to intra-RAT handover)/(the total number of handover events) | [0 ... 100] in unit percentage |
| Total inter-RAT handover failure rate | (the number of failure events related to inter-RAT handover)/(the total number of handover events) | [0 ... 100] in unit percentage |
| Inter-RAT too early handover failure rate | (the number of failure events related to inter-RAT too early handover)/(the total number of handover events) | [0 ... 100] in unit percentage |
| Inter-RAT too late handover failure rate | (the number of failure events related to inter-RAT too late handover)/(the total number of handover events) | [0 ... 100] in unit percentage |
| Inter-RAT unnecessary handover failure rate | (the number of failure events related to inter-RAT unnecessary handover)/(the total number of handover events) | [0 ... 100] in unit percentage |
| Inter-RAT ping-pong handover failure rate | (the number of failure events related to inter-RAT ping-pong handover)/(the total number of handover events) | [0 ... 100] in unit percentage |

7.1.2.2.2 Control Information

The parameter is used to control the MRO function.

| Control parameter | Definition | Legal Values |
| --- | --- | --- |
| MRO function control | This attribute allows the operator to enable/disable the MRO functionality. See attribute mroControl in TS 28.541. | Boolean On, off |
| Maximum deviation of Handover Trigger | This parameter defines the maximum allowed absolute deviation of the Handover Trigger, from the default point of operation (see TS 38.300). | |
| Minimum time between Handover Trigger changes | This parameter defines the minimum allowed time interval between two Handover Trigger change performed by MRO. This is used to control the stability and convergence of the algorithm (see TS 38.300). | |

7.1.2.2.3 Parameters to be Updated

Table 7.1.2.2.3-1 and Table 7.1.2.2.3-2 summarize the handover parameters as defined in TS 38.331.

TABLE 7.1.2.2.3-1

Handover parameters for intra-RAT handovers

| Event | Summary | Tunable parameters |
| --- | --- | --- |
| A1 | Serving becomes better than threshold | Ms, Hys, Thresh, Ms, Hys |
| A2 | Serving becomes worse than threshold | Ms, Hys, Thresh, Ms, Hys |
| A3 | Neighbour becomes offset better than SpCell | Mn, Mp, Ofn, Ocn, Ofp, Ocp, Hys, Off |
| A4 | Neighbour becomes better than threshold | Mn, Ofn, Ocn, Hys, Thresh |
| A5 | SpCell becomes worse than threshold1 and neighbour/SCell becomes better than threshold2 | Mn, Mp, Ofn, Ocn, Hys, Thresh1, Thresh2 |
| A6 | Neighbour becomes offset better than SCell | Mn, Ms, Ocn, Ocs, Hys, Off |

TABLE 7.1.2.2.3-2

Handover parameters for inter RAT handover

| Event | Summary | Tunable parameters |
|---|---|---|
| B1 | Inter RAT neighbour becomes better than threshold | Mn, Ofn, Ocn, Hys, Thresh |
| B2 | PCell becomes worse than threshold1 and inter RAT neighbour becomes better than threshold2 | Mp, Mn, Ofn, Ocn, Hys, Thresh1, Thresh2 |

The ranges of handover parameters to be updated by the MRO are shown in the Table 7.1.2.2.3-3:

TABLE 7.1.2.2.3-3

Ranges of handover parameters

| Control parameters | Definition | Legal Values |
|---|---|---|
| A1 threshold RSRP range | The range of RSRP Threshold as defined in reportConfigNR in TS 38.331 that is used as handover triggering condition for event A1. Allowed value 0 . . . 127, mapping to the range of −156 dBm to −31 dBm with 1 dB resolution (see clause 10.1.6 in TS 38.133) | 0 , , , 126-1 . . . 127 |
| A1 threshold RSRQ range | The range of RSRQ Threshold as defined in reportConfigNR in TS 38.331 that is used as handover triggering condition for event A1. Allowed value 0 . . . 127, mapping to te range of −43 dB to 20 dB with 0.5 dB resolution (see clause 10.1.11 in TS 38.133) | 0 , , , 126-1 . . . 127 |
| A1 hysteresis range | The range of the hysteresis parameter as defined in reportConfigNR in TS 38.331 for A1 event. The allowed value 0 . . . 30 times 0.5 dB to get the actual value. | 0 . . . 29-1 . . . 30 |
| A2 threshold RSRP range | The range of RSRP Threshold as defined in reportConfigNR in TS 38.331 that is used as handover triggering condition for event A2. Allowed value 0 . . . 127, mapping to the range of −156 dBm to −31 dBm with 1 dB resolution (see clause 10.1.6 in TS 38.133) | 0 , , , 126-1 . . . 127 |
| A2 threshold RSRQ range | RSRQ Threshold as defined in reportConfigNR in TS 38.331 that is used as handover triggering condition for event A2. Allowed value 0 . . . 127, mapping to te range of −43 dB to 20 dB with 0.5 dB resolution (see clause 10.1.11 in TS 38.133) | 0 , , , 126-1 . . . 127 |
| A2 hysteresis range | The range of the hysteresis parameter as defined in reportConfigNR in TS 38.331 for A2 event. The allowed value 0 . . . 30 times 0.5 dB to get the actual value. | 0 . . . 29-1 . . . 30 |
| A3 offset RSRP range | The range of RSRP offset as defined in reportConfigNR in TS 38.331 that is used as handover triggering condition for event A3. Allowed value −0 . . . 30 times 0.5 dB to get the actual value. | 0 . . . 29-1 . . . 30 |
| A3 offset RSRQ range | The range of RSRQ offset as defined in reportConfigNR in TS 38.331 that is used as handover triggering condition for event A3. Allowed value −0 . . . 30 times 0.5 dB to get the actual value. | 0 . . . 29-1 . . . 30 |
| A3 hysteresis range | The range of the hysteresis parameter as defined in reportConfigNR in TS 38.331 for A3 event. The allowed value 0 . . . 30 times 0.5 dB to get the actual value. | 0 . . . 29-1 . . . 30 |
| A4 threshold RSRP range | The range of RSRP Threshold as defined in reportConfigNR in TS 38.331 that is used as handover triggering condition for event A4. Allowed value 0 . . . 127, mapping to the range of −156 dBm to −31 dBm with 1 dB resolution (see clause 10.1.6 in TS 38.133) | 0 , , , 126-1 . . . 127 |
| A4 threshold RSRQ range | The range of RSRQ Threshold as defined in reportConfigNR in TS 38.331 that is used as handover triggering condition for event A4. Allowed value 0 . . . 127, mapping to te range of −43 | 0 , , , 126-1 . . . 127 |

TABLE 7.1.2.2.3-3-continued

Ranges of handover parameters

| Control parameters | Definition | Legal Values |
| --- | --- | --- |
| | dB to 20 dB with 0.5 dB resolution (see clause 10.1.11 in TS 38.133) | |
| A4 hysteresis range | The hysteresis parameter as defined in reportConfigNR in TS 38.331 for A4 event. The allowed value 0 . . . 30 times 0.5 dB to get the actual value. | 0 . . . 29-1 . . . 30 |
| A5 threshold1 RSRP range | The range of RSRP Threshold1 as defined in reportConfigNR in TS 38.331 that is used as handover triggering condition for event A5. Allowed value 0 . . . 127, mapping to the range of −156 dBm to −31 dBm with 1 dB resolution (see clause 10.1.6 in TS 38.133) | 0 , , , 126-1 . . . 127 |
| A5 threshold1 RSRQ range | The range of RSRQ Threshold1 as defined in reportConfigNR in TS 38.331 that is used as handover triggering condition for event A5. Allowed value 0 . . . 127, mapping to te range of −43 dB to 20 dB with 0.5 dB resolution (see clause 10.1.11 in TS 38.133) | 0 , , , 126-1 . . . 127 |
| A5 threshold2 RSRP range | The range of RSRP Threshold2 as defined in reportConfigNR in TS 38.331 that is used as handover triggering condition for event A5. Allowed value 0 . . . 127, mapping to the range of −156 dBm to −31 dBm with 1 dB resolution (see clause 10.1.6 in TS 38.133) | 0 , , , 126-1 . . . 127 |
| A5 threshold2 RSRQ range | The range of RSRQ Threshold2 as defined in reportConfigNR in TS 38.331 that is used as handover triggering condition for event A5. Allowed value 0 . . . 127, mapping to te range of −43 dB to 20 dB with 0.5 dB resolution (see clause 10.1.11 in TS 38.133) | 0 , , , 126-1 . . . 127 |
| A5 hysteresis range | The range of the hysteresis parameter as defined in reportConfigNR in TS 38.331 for A5 event. The allowed value 0 . . . 30 times 0.5 dB to get the actual value. | 0 . . . 29-1 . . . 30 |
| A6 offset RSRP range | The range of RSRP offset as defined in reportConfigNR in TS 38.331 that is used as handover triggering condition for event A6. Allowed value −0 . . . 30 times 0.5 dB to get the actual value. | 0 . . . 29-1 . . . 30 |
| A6 offset RSRQ range | The range of RSRQ offset as defined in reportConfigNR in TS 38.331 that is used as handover triggering condition for event A6. Allowed value −0 . . . 30 times 0.5 dB to get the actual value. | 0 . . . 29-1 . . . 30 |
| A6 hysteresis range | The range of the hysteresis parameter as defined in reportConfigNR in TS 38.331 for A6 event. The allowed value 0 . . . 30 times 0.5 dB to get the actual value. | 0 . . . 29-1 . . . 30 |
| B1 threshold RSRP range | The range of RSRP Threshold as defined in reportConfigNR in TS 38.331 that is used as handover triggering condition for event B1. Allowed value 0 . . . 97, mapping to the range of 140 dBm to −44 dBm with 1 dB resolution (see clause 9.1.4 in TS 36.133) | 0 , , , 96-1 . . . 97 |
| B1 threshold RSRQ range | The range of RSRQ Threshold as defined in reportConfigNR in TS 38.331 that is used as handover triggering condition for event B1. Allowed value 0 . . . 34, mapping to te range of −19.5 dB to −3 dB with 0.5 dB resolution (see clause 9.1.7 in TS 36.133) | 0 , , , 33-1 . . . 34 |
| B1 hysteresis range | The range of the hysteresis parameter as defined in reportConfigNR in TS 38.331 for B1 event. The allowed value 0 . . . 30 times 0.5 dB to get the actual value. | 0 . . . 29-1 . . . 30 |
| B2 threshold1 RSRP range | The range of RSRP Threshold1 as defined in reportConfigNR in TS 38.331 that is used as handover triggering condition for event B2. Allowed value 0 . . . 127, mapping to the range of −156 dBm to −31 dBm with 1 dB resolution (see clause 10.1.6 in TS 38.133) | 0 , , , 126-1 . . . 127 |
| B2 threshold1 RSRQ range | The range of RSRQ Threshold1 as defined in reportConfigNR in TS 38.331 that is used as handover triggering condition for event B2. | 0 , , , 126-1 . . . 127 |

TABLE 7.1.2.2.3-3-continued

Ranges of handover parameters

| Control parameters | Definition | Legal Values |
|---|---|---|
| | Allowed value 0 . . . 127, mapping to te range of −43 dB to 20 dB with 0.5 dB resolution (see clause 10.1.11 in TS 38.133) | |
| B2 threshold2 RSRP range | The range of RSRP Threshold2 as defined in reportConfigNR in TS 38.331 that is used as handover triggering condition for event B2. Allowed value 0 . . . 97, mapping to the range of 140 dBm to -44 dBm with 1 dB resolution (see clause 9.1.4 in TS 36.133) | 0 , , , 96-1 . . . 97 |
| B2 threshold2 RSRQ range | The range of RSRQ Threshold2 as defined in reportConfigNR in TS 38.331 that is used as handover triggering condition for event B2. Allowed value 0 . . . 34, mapping to te range of −19.5 dB to −3 dB with 0.5 dB resolution (see clause 9.1.7 in TS 36.133) | 0 , , , 33-1 . . . 34 |
| B2 hysteresis range | The range of the hysteresis parameter as defined in reportConfigNR in TS 38.331 for B2 event. The allowed value 0 . . . 30 times 0.5 dB to get the actual value. | 0 . . . 29-1 . . . 30 |

7.1.2.3 MnS Component Type C Definition
7.1.2.3.1 Performance Measurements
Performance measurements related MRO are captured in Table 7.1.2.3.1.-1:

TABLE 7.1.2.3.1-1

MRO related performance measurements

| Performance measurements | Description | Related targets |
|---|---|---|
| Number of handover events | Includes all successful and unsuccessful handover events (see clause 5.1.1.6 in TS 28.552). | Total handover failure rate |
| Number of handover failures | Includes unsuccessful handover events with failure causes (see clause 5.1.1.6 in TS 28.552). | Total handover failure rate |
| Number of intra-RAT handover events | Includes all successful and unsuccessful intra-RAT handover eventsl | Total intra-RAT handover failure rate |
| Number of intra-RAT handover failures | Includes unsuccessful intra-RAT handover events with failure causes. | Total intra-RAT handover failure rate |
| Number of inter-RAT handover events | Includes all successful and unsuccessful inter-RAT handover events. | Total inter-RAT handover failure rate |
| Number of inter-RAT handover failures | Includes unsuccessful inter-RAT handover events with failure causes. | Total inter-RAT handover failure rate |
| Number of inter-RAT too early handover failures | Detected when an RLF occurs after the UE has stayed for a long period of time in the cell. | Intra-RAT too early handover failure rate |
| Number of intra-RAT too late handover failures | Detected when an RLF occurs shortly after a successful handover from a source cell to a target cell or a handover failure occurs during the handover procedure. | Intra-RAT too late handover failure rate |
| Number of intra-RAT handover failures to wrong cell | Detected when an RLF occurs shortly after a successful handover from a source cell to a target cell or a handover failure occurs during the handover procedure. | Intra-RAT handover to wrong cell failure rate |
| Number of inter-RAT too early handover failures | Detected when an RLF occurs after the UE has stayed in an E-UTRAN cell which connects with 5GC for a long period of time. | Inter-RAT too early handover failure rate |
| Number of inter-RAT too late handover failures | Deteccted when an RLF occurs shortly after a successful handover from an E-UTRAN cell which connects with EPC to a target cell in a E-UTRAN cell which connects with 5GC. | Inter-RAT too late handover failure rate |

TABLE 7.1.2.3.1-1-continued

MRO related performance measurements

| Performance measurements | Description | Related targets |
| --- | --- | --- |
| Number of unnecessary handover to another RAT | Detected when a UE is handed over from NG-RAN to other system (e.g. UTRAN) even though quality of the NG-RAN coverage was sufficient for the service used by the UE. | Inter-RAT unnecessary handover failure rate |
| Number of inter-RAT handover ping pong | Detected when an UE is handed over from a cell in a source system (e.g. NG-RAN) to a cell in a target system different from the source system (e.g. E-UTRAN), then within a predefined limited time the UE is handed over back to a cell in the source system, while the coverage of the source system was sufficient for the service used by the UE. | Inter-RAT ping-pong handover failure rate |

8 SON Procedures 8.2 Distributed SON Management 8.2.2 MRO

Figure 4:
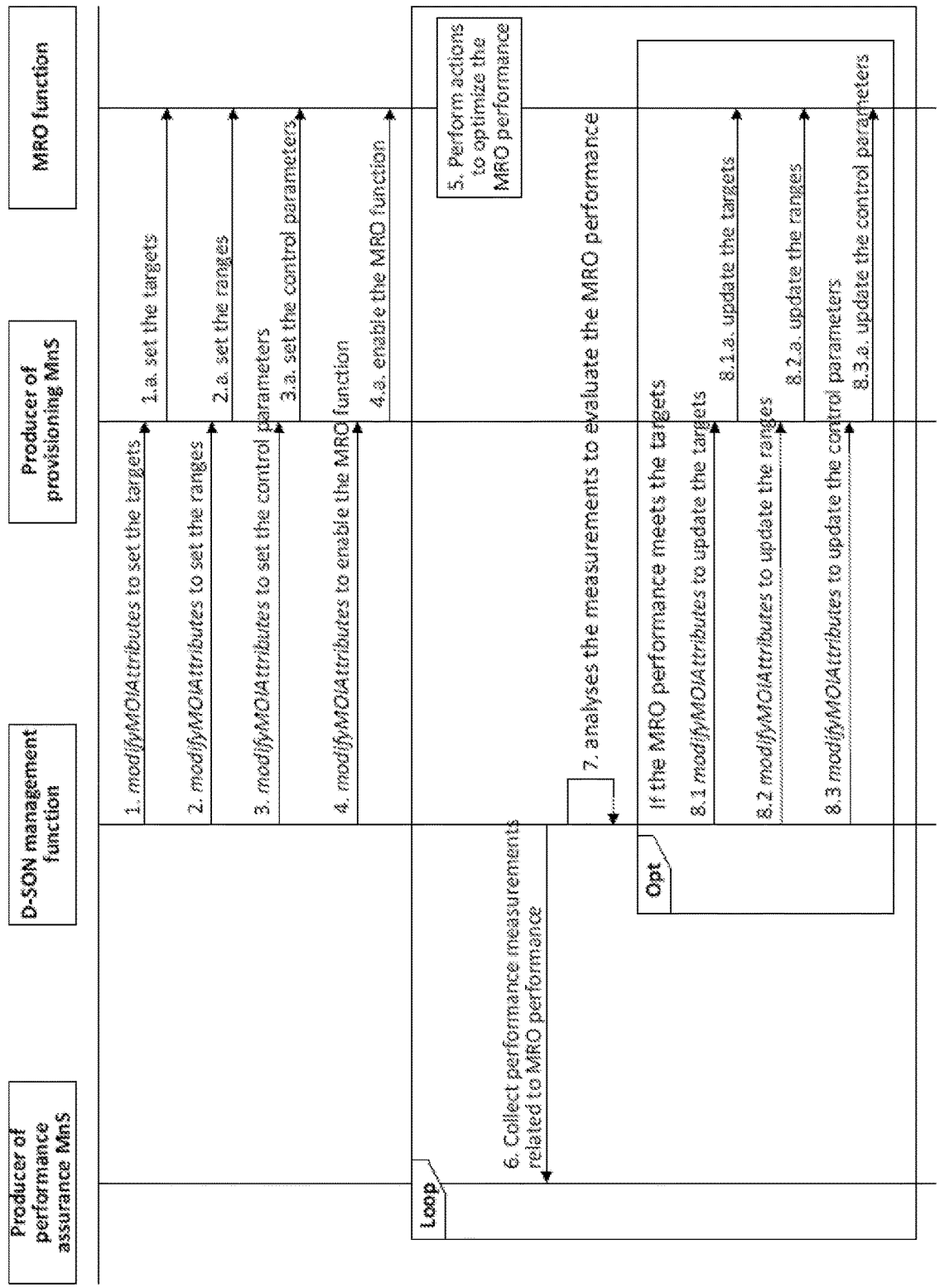
FIG. 4 illustrates an MRO procedure in accordance with some embodiments.

FIG. 4 illustrates an MRO procedure in accordance with some embodiments. FIG. 4 describes the manner in which the D-SON management function can manage the MRO function in accordance with various embodiments. It is assumed that the D-SON management function has consumed the performance assurance MnS to create PM jobs to collect handover related measurements. The operations in FIG. 4 include:

1. The D-SON management function consumes the provisioning MnS with modifyMOIAttributes operation (see clause 5.1.3 in TS 28.532, v. 16.3.0, 2020-03-27) to configure targets for the MRO function.

1.a The provisioning MnS sets the targets for MRO function (NOTE).

2. The MRO management function consumes the management service for NF provisioning with modifyMOIAttributes operation to configure the ranges of handover parameters.

2.a The MnS of provisioning sets the ranges for MRO function (NOTE).

3. The MRO management function consumes the management service for NF provisioning with modifyMOIAttributes operation to configure the MRO control parameters (e.g. Maximum deviation of Handover Trigger, Minimum time between Handover Trigger changes).

2.a The MnS of provisioning sets the MRO control parameters for MRO function (NOTE).

4. The D-SON management function consumes the NF provisioning MnS with modifyMOIAttributes operation to enable the MRO function for a given NR cell.

3.a The provisioning MnS enables the MRO function (NOTE).

5. The MRO function receives MRO information reports from UE(s), and analyses them to determine the actions to optimize the MRO performance. If the performance does not meet the targets, it updates the handover parameters.

6. The D-SON management function collects MRO related performance measurements.

7. The D-SON management function analyses the measurements to evaluate the MRO performance.

8. The D-SON management function performs one of the following actions, when the MRO performance does not meet the targets:

8.1. Consume the MnS of provisioning with modifyMOIAttributes operation to update the targets of the MRO function;

8.1.a The MnS of provisioning updates the targets for MRO function (NOTE).

8.2. Consume the MnS of provisioning with modifyMOIAttributes operation to update the ranges of the handover parameters;

8.2.a The MnS of provisioning updates the ranges of the handover parameters (NOTE).

8.3. Consume the MnS of provisioning with modifyMOIAttributes operation to update the control parameters;

8.3.a The MnS of provisioning updates the control parameters (NOTE).

NOTE: The interface between provisioning MnS and MRO function is not subject to standardization.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus configured to operate as a distributed self-organizing network (D-SON) management function in a new radio (NR) network, the apparatus comprising:
processing circuitry configured to:
send, to a producer of provisioning Management Service (MnS), at least one request to configure at least one target, control parameters, and at least one range of handover parameters for a Mobility Robustness Optimization (MRO) function, the control parameters including MRO function control to enable and disable MRO functionality, a maximum deviation of handover trigger, and a minimum time between handover trigger changes;
send, after transmission of the at least one request, a request to the producer of provisioning MnS to enable an unenabled MRO function for an NR cell;
collect MRO-related performance measurements from the MRO function for the NR cell;
analyze the MRO-related performance measurements to evaluate MRO performance and determine whether the at least one target has been met after optimization of the MRO performance; and
in response a determination that the at least one target has not been met, send, to the producer of provisioning MnS, at least one update request to update at least one of the at least one range of handover parameters or the control parameters; and
memory configured to store the MRO-related performance measurements.

2. The apparatus of claim 1, wherein the at least one request comprises a management service for network function (NF) provisioning with modifyMOIAttributes operation for consumption by the producer of provisioning MnS.

3. The apparatus of claim 1, wherein:
the at least one range of handover parameters include:
a range of Reference Signal Received Power (RSRP) threshold used as handover triggering condition for each of event A1, A2, A4, and B1,
a range of Reference Signal Received Quality (RSRQ) threshold used as handover triggering condition for each of event A1, A2, A4, and B1,
a range of hysteresis parameter for each of event A1, A2, A3, A4, A5, A6, B1, and B2,
a range of RSRP offset that is used as handover triggering condition for each of event A3 and A6,
a range of RSRQ offset that is used as handover triggering condition for each of event A3 and A6,
a range of RSRP threshold1 and threshold2 used as handover triggering condition for each of event A5 and B2, and
a range of RSRQ threshold1 and threshold2 used as handover triggering condition for each of event A5 and B2 and
event A1 is a first serving cell measurement becomes better than a first threshold, event A2 is a second serving cell measurement becomes worse than a second threshold, event A3 is a first neighbor cell measurement becomes better than a special cell (SpCell) measurement by a first offset, event A4 is a second neighbor measurement becomes better than a third threshold, event A5 is a second SpCell measurement becomes worse than a fourth threshold and a third neighbor measurement becomes better than a fifth threshold, event A6 is a fourth neighbor measurement becomes better than a secondary cell (SCell) measurement by a second offset, event B1 is a first inter radio access technology (RAT) neighbor measurement becomes better than a sixth threshold, and event B2 is a primary cell (PCell) measurement becomes worse than a seventh threshold and a second inter RAT neighbor measurement becomes better than an eight threshold.

4. The apparatus of claim 1, wherein the at least one target comprises a set of targets selected from a plurality of targets that include: total handover failure rate, total intra-radio access technology (RAT) handover failure rate, and total inter-RAT handover failure rate.

5. The apparatus of claim 4, wherein the MRO-related performance measurements comprise: number of handover events, number of handover failures, number of each of intra-radio access technology (RAT) and inter-RAT handover events, number of each of intra-RAT and inter-RAT failures, number of each of intra-RAT and inter-RAT too early handover failures, number of each of intra-RAT and inter-RAT too late handover failures, number of intra-RAT handover failures to wrong cell, number of unnecessary handovers to another RAT, and number of inter-RAT handover ping-pong.

6. The apparatus of claim 4, wherein the plurality of targets further include: intra-RAT and inter-RAT too early handover failure rate, intra-RAT and inter-RAT too late handover failure rate, intra-RAT handover to wrong cell failure rate, and inter-RAT ping-pong handover failure rate.

7. The apparatus of claim 1, wherein the producer of provisioning MnS is provided by an MRO management function in an operation and maintenance module (OAM) of the D-SON and the MRO function is provided in a network function (NF).

8. The apparatus of claim 7, wherein the NF is a gNB.

9. An apparatus configured to operate as a producer of provisioning Management Service (MnS) in a new radio (NR) network, the apparatus comprising:
processing circuitry configured to:
receive, from a distributed self-organizing network (D-SON) management function, at least one request to configure at least one target, control parameters, and at least one range of handover parameters for a Mobility Robustness Optimization (MRO) function, the at least one request comprising a modifyMOI-Attributes operation, the control parameters including MRO function control to enable and disable MRO functionality, a maximum deviation of handover trigger, and a minimum time between handover trigger changes;
in response to reception of the at least one request, set the at least one target and at least one range of handover parameters for the MRO function; and
in response a determination that the the at least one target has not been met, based on MRO information reports from user equipment (UEs), receive, from the D-SON management function, at least one update request to update at least one of the at least one target, at least one range of handover parameters, or the control parameters, the at least one update request based on MRO-related performance measurements; and
memory configured to store the at least one target and at least one range of handover parameters.

10. The apparatus of claim 9, wherein the processing circuitry is further configured to receive, from the D-SON management function, a request comprising a modifyMOI-Attributes operation to enable the MRO function in response a NR cell associated with the MRO function not being enabled.

11. The apparatus of claim 9, wherein:
the at least one range of handover parameters include:
a range of Reference Signal Received Power (RSRP) threshold used as handover triggering condition for each of event A1, A2, A4, and B1,
a range of Reference Signal Received Quality (RSRQ) threshold used as handover triggering condition for each of event A1, A2, A4, and B1,
a range of hysteresis parameter for each of event A1, A2, A3, A4, A5, A6, B1, and B2,
a range of RSRP offset that is used as handover triggering condition for each of event A3 and A6,
a range of RSRQ offset that is used as handover triggering condition for each of event A3 and A6,
a range of RSRP threshold1 and threshold2 used as handover triggering condition for each of event A5 and B2, and
a range of RSRQ threshold1 and threshold2 used as handover triggering condition for each of event A5 and B2, and
event A1 is a first serving cell measurement becomes better than a first threshold, event A2 is a second serving cell measurement becomes worse than a second threshold, event A3 is a first neighbor cell measurement becomes better than a special cell (SpCell) measurement by a first offset, event A4 is a second neighbor measurement becomes better than a third threshold, event A5 is a second SpCell measurement becomes worse than a fourth threshold and a third neighbor measurement becomes better than a fifth threshold, event A6 is a fourth neighbor measurement becomes better than a secondary cell (SCell) measurement by a second offset, event B1 is a first inter radio access technology (RAT) neighbor measurement becomes better than a sixth threshold, and event B2 is a primary cell (PCell) measurement becomes worse than a seventh threshold and a second inter RAT neighbor measurement becomes better than an eight threshold.

12. The apparatus of claim 9, wherein the at least one target comprises a set of targets selected from a plurality of targets that include: total handover failure rate, total intra-radio access technology (RAT) handover failure rate, and total inter-RAT handover failure rate.

13. The apparatus of claim 12, wherein the plurality of targets further include: intra-RAT and inter-RAT too early handover failure rate, intra-RAT and inter-RAT too late handover failure rate, intra-RAT handover to wrong cell failure rate, and inter-RAT ping-pong handover failure rate.

14. The apparatus of claim 9, wherein the MRO-related performance measurements comprise: number of handover events, number of handover failures, number of each of intra-radio access technology (RAT) and inter-RAT handover events, number of each of intra-RAT and inter-RAT failures, number of each of intra-RAT and inter-RAT too early handover failures, number of each of intra-RAT and inter-RAT too late handover failures, number of intra-RAT handover failures to wrong cell, number of unnecessary handovers to another RAT, and number of inter-RAT handover ping-pong.

15. A non-transitory computer-readable storage medium that stores instructions for execution by one or more processors configured to provide a distributed self-organizing network (D-SON) management function, the one or more processors to configure the D-SON management function to, when the instructions are executed:
send, to a producer of provisioning Management Service (MnS), a plurality of requests to configure at least one target, control parameters, and at least one range of handover parameters for a Mobility Robustness Optimization (MRO) function, the control parameters including MRO function control to enable and disable MRO functionality, a maximum deviation of handover trigger, and a minimum time between handover trigger changes;
send, to the producer of provisioning MnS, a request to enable the MRO function after transmission of the plurality of requests;
collect MRO-related performance measurements, analyze the MRO-related performance measurements to evaluate MRO performance, and determine, based on an evaluation of the MRO performance, whether the at least one target has been met; and
in response a determination that the at least one target has not been met, send, to the producer of provisioning MnS, at least one update request to update the at least one target, at least one range of handover parameters, or the control parameters.

16. The medium of claim 15, wherein:
the at least one target comprises a set of targets selected from a plurality of targets that include: total handover failure rate, total intra-radio access technology (RAT) handover failure rate, and total inter-RAT handover failure rate, and
MRO-related performance measurements comprise: number of handover events, number of handover failures, number of each of intra-radio access technology (RAT) and inter-RAT handover events, number of each of intra-RAT and inter-RAT failures, number of each of intra-RAT and inter-RAT too early handover failures, number of each of intra-RAT and inter-RAT too late handover failures, number of intra-RAT handover failures to wrong cell, number of unnecessary handovers to another RAT, and number of inter-RAT handover ping-pong.

\* \* \* \* \*

UNITED STATES PATENT AND TRADEMARK OFFICE
CERTIFICATE OF CORRECTION

| | | |
|---|---|---|
| PATENT NO. | : 11,895,543 B2 | Page 1 of 1 |
| APPLICATION NO. | : 17/219292 | |
| DATED | : February 6, 2024 | |
| INVENTOR(S) | : Yao et al. | |

It is certified that error appears in the above-identified patent and that said Letters Patent is hereby corrected as shown below:

In the Claims

In Column 24, Line 25, in Claim 3, after "B2", insert --,--

In Column 25, Line 23, in Claim 9, delete "the the" and insert --the-- therefor

Signed and Sealed this
Eighteenth Day of March, 2025

Coke Morgan Stewart
*Acting Director of the United States Patent and Trademark Office*